(12) United States Patent
Smith

(10) Patent No.: US 12,392,446 B2
(45) Date of Patent: Aug. 19, 2025

(54) ADJUSTABLE BLENDER PUMP MOUNT FOR HYDRAULIC FRACTURING

(71) Applicant: STEWART & STEVENSON LLC, Houston, TX (US)

(72) Inventor: Harrison Smith, Houston, TX (US)

(73) Assignee: STEWART & STEVENSON LLC, Houston, TX (US)

( * ) Notice: Subject to any disclaimer, the term of this patent is extended or adjusted under 35 U.S.C. 154(b) by 0 days.

(21) Appl. No.: 18/901,454

(22) Filed: Sep. 30, 2024

(65) Prior Publication Data

US 2025/0116365 A1    Apr. 10, 2025

Related U.S. Application Data

(60) Provisional application No. 63/543,235, filed on Oct. 9, 2023.

(51) Int. Cl.
*F16M 3/00* (2006.01)
*B01D 46/00* (2022.01)
(Continued)

(52) U.S. Cl.
CPC ........... *F16M 3/00* (2013.01); *B01D 46/0005* (2013.01); *B01F 23/59* (2022.01);
(Continued)

(58) Field of Classification Search
CPC .. F16M 3/00; B01D 46/0005; B01D 2279/00; B01F 23/59; B01F 33/5026; B01F 35/7544; B01F 2101/49; E21B 43/2607
See application file for complete search history.

(56) References Cited

U.S. PATENT DOCUMENTS 2,827,121 A * 3/1958 Nowak ................ C09K 8/5086
                                                      166/295
5,425,421 A * 6/1995 Coleman ............... E21B 33/138
                                                      166/250.14

(Continued)

FOREIGN PATENT DOCUMENTS

CN       102602322 A  *  7/2012
CN       103912259 A  *  7/2014
(Continued)

OTHER PUBLICATIONS

Decision to Grant issued in Russian App. No. 2017133921 dated Mar. 19, 2020; and English translation thereof (15 pages).

(Continued)

*Primary Examiner* — Bayan Salone
(74) *Attorney, Agent, or Firm* — Ewing & Jones, PLLC

(57) ABSTRACT

A blender system includes a skid and a blender assembly, the blender assembly including a blender tub and the blender tub including an outlet. The blender system also includes a discharge pump, the discharge pump coupled to the outlet and an adjustable mount, the adjustable mount supporting the discharge pump. The adjustable mount includes a bottom plate, the bottom plate including a plurality of rows of slots and two side gussets, the side gussets having tabs, the tabs inserted in the rows of slots of the bottom plate. In addition, the adjustable mount includes a top plate, the top plate positioned perpendicularly to the two side gussets and in parallel with the bottom plate. The top plate is affixed to the side gussets and to the discharge pump.

9 Claims, 5 Drawing Sheets

(51) Int. Cl.
  *B01F 23/50*  (2022.01)
  *B01F 33/50*  (2022.01)
  *B01F 33/502*  (2022.01)
  *B01F 35/75*  (2022.01)
  *E21B 43/26*  (2006.01)
  *B01F 101/49*  (2022.01)

(52) U.S. Cl.
  CPC ...... *B01F 33/5026* (2022.01); *B01F 35/7544* (2022.01); *E21B 43/2607* (2020.05); *B01D 2279/00* (2013.01); *B01F 2101/49* (2022.01)

(56) References Cited

U.S. PATENT DOCUMENTS

| | | | | |
|---|---|---|---|---|
| 8,774,972 | B2* | 7/2014 | Rusnak | F04D 15/0066 |
| | | | | 700/282 |
| 8,789,601 | B2* | 7/2014 | Broussard | E21B 43/2607 |
| | | | | 166/308.1 |
| 9,410,410 | B2* | 8/2016 | Broussard | H02P 23/00 |
| 9,435,175 | B2* | 9/2016 | Chong | E21B 43/2405 |
| 9,534,473 | B2* | 1/2017 | Morris | F01D 15/10 |
| 9,534,604 | B2* | 1/2017 | Lopez | F04D 15/029 |
| 9,650,879 | B2* | 5/2017 | Broussard | F04D 29/66 |
| 10,227,854 | B2* | 3/2019 | Glass | F04B 47/02 |
| 10,514,301 | B2* | 12/2019 | Luharuka | G05B 19/0425 |
| 2008/0209997 | A1* | 9/2008 | Bailey | E21B 43/2607 |
| | | | | 702/11 |
| 2009/0151927 | A1* | 6/2009 | Crawford | E21B 43/168 |
| | | | | 166/90.1 |
| 2010/0027371 | A1* | 2/2010 | Lucas | B01F 23/59 |
| | | | | 366/134 |
| 2010/0282464 | A1* | 11/2010 | Medvedev | G05D 7/0676 |
| | | | | 166/280.1 |
| 2011/0146980 | A1* | 6/2011 | Crill | C09K 8/665 |
| | | | | 166/271 |
| 2012/0255734 | A1* | 10/2012 | Coli | F04B 19/22 |
| | | | | 166/305.1 |
| 2013/0306322 | A1* | 11/2013 | Sanborn | E21B 43/2607 |
| | | | | 166/308.1 |
| 2014/0174717 | A1* | 6/2014 | Broussard | E21B 43/2607 |
| | | | | 166/66.4 |
| 2014/0238742 | A1 | 8/2014 | Borek et al. | |
| 2014/0251623 | A1* | 9/2014 | Lestz | E21B 43/26 |
| | | | | 166/308.2 |
| 2014/0277772 | A1 | 9/2014 | Lopez et al. | |
| 2014/0290768 | A1* | 10/2014 | Randle | E21B 43/2607 |
| | | | | 137/565.11 |
| 2015/0114652 | A1* | 4/2015 | Lestz | E21B 43/267 |
| | | | | 166/308.1 |
| 2015/0129210 | A1* | 5/2015 | Chong | F28D 21/00 |
| | | | | 166/57 |
| 2015/0252661 | A1* | 9/2015 | Glass | E21B 43/2607 |
| | | | | 166/308.1 |
| 2016/0032703 | A1* | 2/2016 | Broussard | E21B 43/2607 |
| | | | | 166/250.01 |
| 2016/0177678 | A1* | 6/2016 | Morris | E21B 41/0085 |
| | | | | 60/772 |
| 2016/0208592 | A1* | 7/2016 | Oehring | F04D 29/664 |
| 2017/0067689 | A1* | 3/2017 | Surjaatmadja | F28D 1/024 |
| 2017/0226842 | A1* | 8/2017 | Omont | E21B 43/255 |
| 2017/0241307 | A9* | 8/2017 | Borek | F01M 1/16 |
| 2017/0322086 | A1 | 11/2017 | Luharuka et al. | |

FOREIGN PATENT DOCUMENTS

| | | | | |
|---|---|---|---|---|
| CN | 204099301 U | * | 1/2015 | |
| CN | 104364465 A | * | 2/2015 | ......... E21B 43/2607 |
| RU | 2267610 C2 | * | 1/2006 | ............. E21B 43/26 |
| RU | 2379497 C1 | * | 1/2010 | ........... G05D 7/0676 |
| WO | WO-2007113528 A1 | * | 10/2007 | ......... E21B 43/2607 |

OTHER PUBLICATIONS

Office Action issued in Chinese App. No. 201680024244.0 dated Jul. 10, 2020; and English translation thereof (14 pages).

* cited by examiner

ADJUSTABLE BLENDER PUMP MOUNT FOR HYDRAULIC FRACTURING

CROSS-REFERENCE TO RELATED APPLICATIONS

This application is a nonprovisional application which claims priority from U.S. provisional application No. 63/543,235, filed Oct. 9, 2023, which is incorporated by reference herein in its entirety.

TECHNICAL FIELD/FIELD OF THE DISCLOSURE

The present disclosure relates generally to well service equipment and specifically to equipment used with well fluids.

BACKGROUND OF THE DISCLOSURE

During drilling, completion, and production operations, fluids are circulated through a wellbore. Various chemicals are introduced into the fluids, referred to herein as the slurry, to produce slurry having desirable characteristics. In some cases, chemicals may be provided in dry form. Such chemicals and fluid may be mixed in a blender system.

SUMMARY

A blender system is disclosed. The blender system includes a skid and a blender assembly, the blender assembly including a blender tub and the blender tub including an outlet. The blender system also includes a discharge pump, the discharge pump coupled to the outlet and an adjustable mount, the adjustable mount supporting the discharge pump. The adjustable mount includes a bottom plate, the bottom plate including a plurality of rows of slots and two side gussets, the side gussets having tabs, the tabs inserted in the rows of slots of the bottom plate. In addition, the adjustable mount includes a top plate, the top plate positioned perpendicularly to the two side gussets and in parallel with the bottom plate. The top plate is affixed to the side gussets and to the discharge pump.

A method of mounting a discharge pump is disclosed. The method includes positioning a discharge pump and supplying an adjustable mount. The adjustable mount includes a bottom plate, the bottom plate including a plurality of rows of slots and two side gussets, the side gussets having tabs, the tabs inserted in the rows of slots of the bottom plate. The adjustable mount also includes a top plate, the top plate positioned perpendicularly to the two side gussets and in parallel with the bottom plate, the top plate affixed to the side gussets. The method also includes orienting the adjustable mount so as to support the discharge pump by adjusting the position of the two side gussets with respect to the bottom plate. The method also includes supporting the discharge pump with the adjustable mount.

A method of mounting an air filter to a side support is disclosed. The method includes supplying a side support, the side support including tabs, and affixing an air filter adjustable mount. The air filter adjustable mount includes a back plate, the back plate including slots and a side plate, the side plate either affixed to or integral to the back plate, the side plate perpendicular to the back plate. The method also includes adjusting the tabs so that the tabs fit within the slots and positioning the air filter within the air filter adjustable mount.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
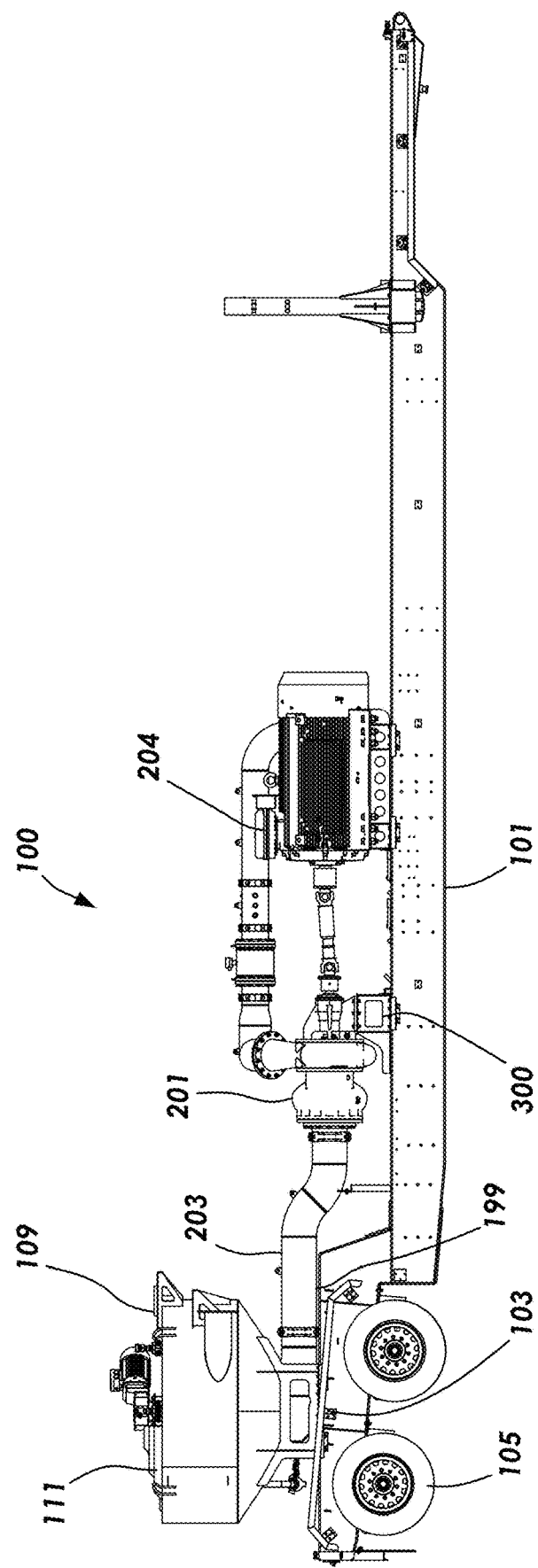
FIG. 1 depicts a side view of a blender system consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts blender system 100. Blender system 100 may be used to prepare fluids for use in wellbore operations including stimulation operations such as hydraulic fracturing operation. For the purposes of this disclosure and without any intent to limit the scope of this disclosure, the fluids prepared by blender system 100 are referred to herein as a slurry made up of ingredients, chemicals, products, and base fluids as understood in the art such as, for example and without limitation, friction reducer, high viscosity friction reducer, guar or synthetic gel, inhibitors, PH buffers, and biocides.

In some embodiments, blender system 100 may include skid 101. Skid 101 may support components of blender system 100 and may provide for transportation of blender system 100 while allowing all components thereof to remain operatively coupled. In some embodiments, skid 101 may be positioned on or may be part of trailer 103 that includes one or more wheels 105 positioned to allow blender system 100 to be transported by towing. In some such embodiments, trailer 103 may be a rockover trailer. In certain embodiments, skid 101 may be mounted on a truck chassis.

Blender system 100 may include blender assembly 109. Blender assembly 109 may be adapted to mix one or more ingredients, chemicals, and products with a base fluid to generate a slurry used, for example and without limitation, in a wellbore stimulation operation such as a hydraulic fracturing operation. Blender assembly 109 may include blender tub 111.

In some embodiments, blender tub 111 may include outlet 199 positioned at the base of blender tub 111. Outlet 199 may be fluidly coupled to discharge pump 201 by outlet pipe 203. In certain embodiments, such as the one shown in FIGS. 1 and 2, discharge pump 201 may be a centrifugal pump, although any suitable pump may be used. Discharge pump 201 may be driven by discharge pump motor 204. In some embodiments, discharge pump motor 204 may be an electric motor.

Figure 2:
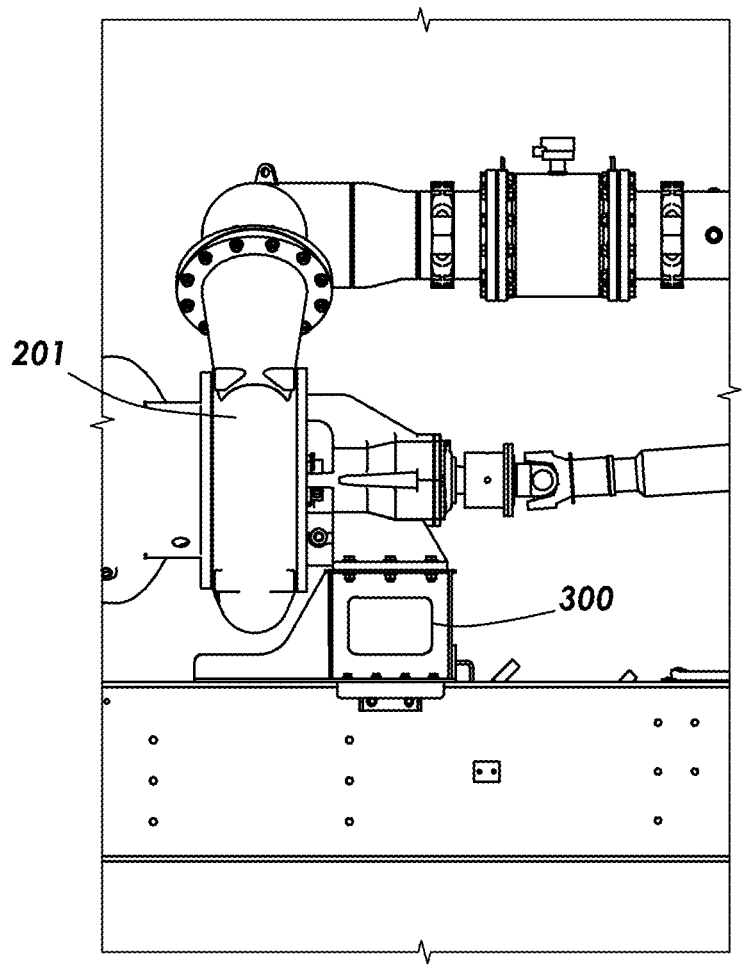
FIG. 2 is an expanded side view of the blender system of FIG. 1 showing an adjustable mount consistent with at least one embodiment of the present disclosure.

Discharge pump 201 may be supported, at least in part, by adjustable mount 300. Adjustable mount 300 may adjust to accommodate a variety of discharge pump 201 designs. Thus, discharge pump 201 may be removed without also removing adjustable mount 300. FIG. 2 shows adjustable mount 300 in place with discharge pump 201.

Figure 3:
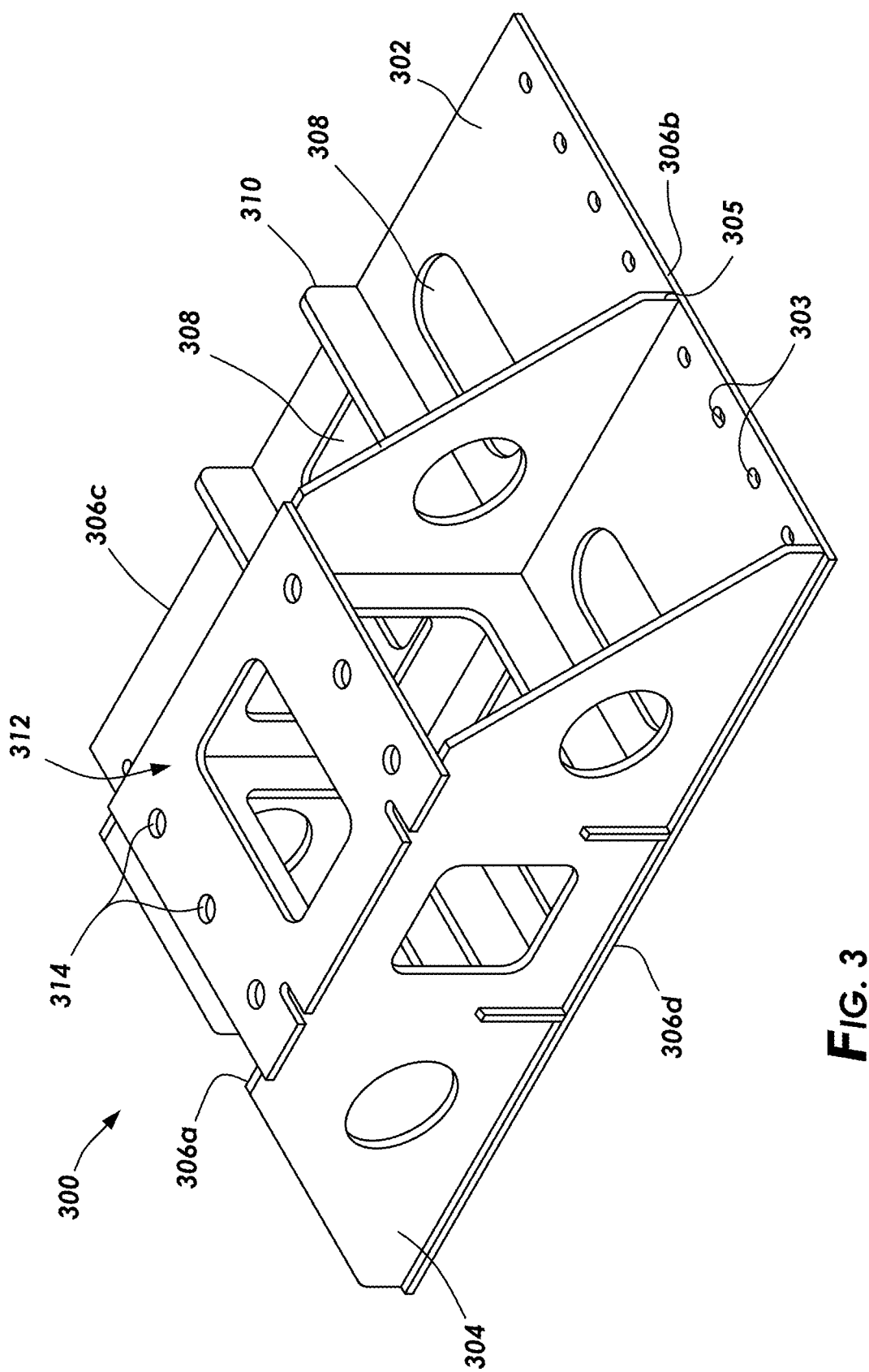
FIG. 3 depicts an adjustable mount consistent with certain embodiments of the present disclosure.

FIG. 3 depicts adjustable mount 300 consistent with certain embodiments of the present disclosure. Adjustable mount 300 includes bottom plate 302. Bottom plate 302 includes slots 303 for mounting side gussets 304. Slots 303 may be positioned in rows along sides 306a, 306b of bottom plate 302, in certain embodiments. Side gussets 304 include tabs 305 for insertion into slots 303 to hold side gussets 304 in place with respect to bottom plate 302, but allow for limited movement inside side gusset 304 placement along bottom plate 302. For example, in certain embodiments, slots may be between ¼" and ¾" wide, or, for example, ½" wide, to allow for misalignment between discharge pump 201 and skid 101. In certain embodiments, side gussets 304 may be positioned perpendicularly or approximately perpendicularly, i.e., at an angle between 75 degrees and 105 degrees, to bottom plate 302.

In some embodiments, bottom plate 302 may include cutouts 308 to reduce the weight of adjustable mount 300. In addition, support cross plates 310 may be connected to bottom plate 302 to provide structural support for adjustable mount 300. Support cross plates 310 may be placed perpendicular or approximately perpendicular to bottom plate 302 and side gussets 304. Support cross plates 310 may extend across bottom plate 302 from side 306c to 306d.

Side gussets 304 may support top plate 312. Top plate 312 may be positioned perpendicularly or approximately perpendicularly to side gussets 304 and parallel or approximately parallel to bottom plate 302. As shown in FIGS. 1 and 2, top plate 312 may mount to discharge pump 201, thereby providing support to discharge pump 201. Mounting top plate 312 to discharge pump 201 may be accomplished through the use of mounting holes 314 in top plate 312.

As described above, adjustable mount 300 may accommodate a number of different types of discharge pumps 201. Before adjustable mount 300 is set in place, adjustable mount 300 may be adjusted by moving side gussets 304 along the rows of slots 303 in bottom plate 302 and within slots 303 within tabs 305. In certain embodiments, once adjustments have been made, adjustable mount 300 may be set in place. In other embodiments, once adjustments have been made, bottom plate 302, side gussets 304 and top plate 312 may be affixed together, such as by welding, and then set in place.

Figure 4:
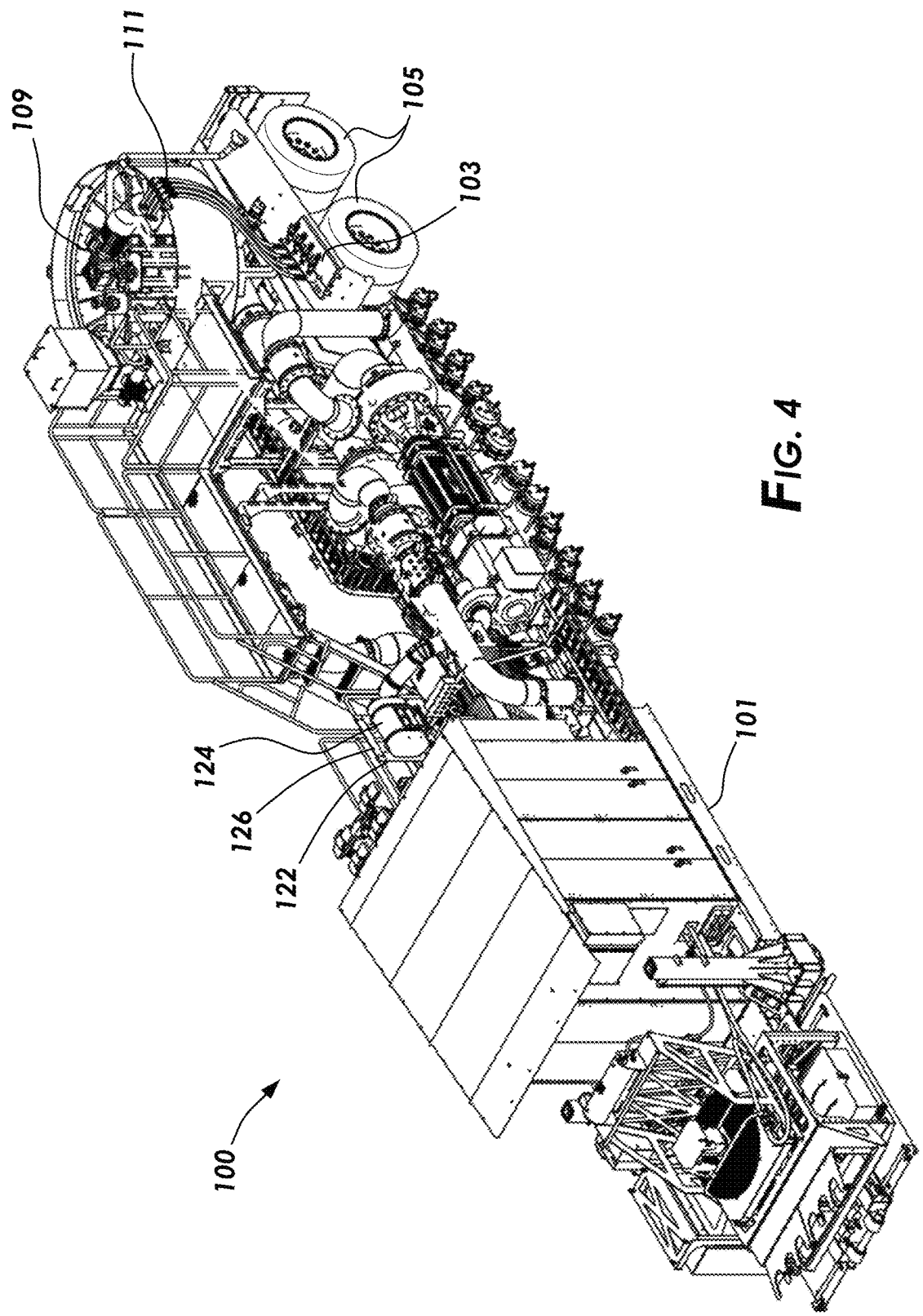
FIG. 4 depicts a blender system with a side-mounted air filter with an air filter adjustable mount consistent with certain embodiments of the present disclosure.

As shown in FIG. 4, side support 122 may be affixed to air filter adjustable mount 126, which may hold air filter 124. Side support 122 may be affixed to skid 101.

Figure 5B:
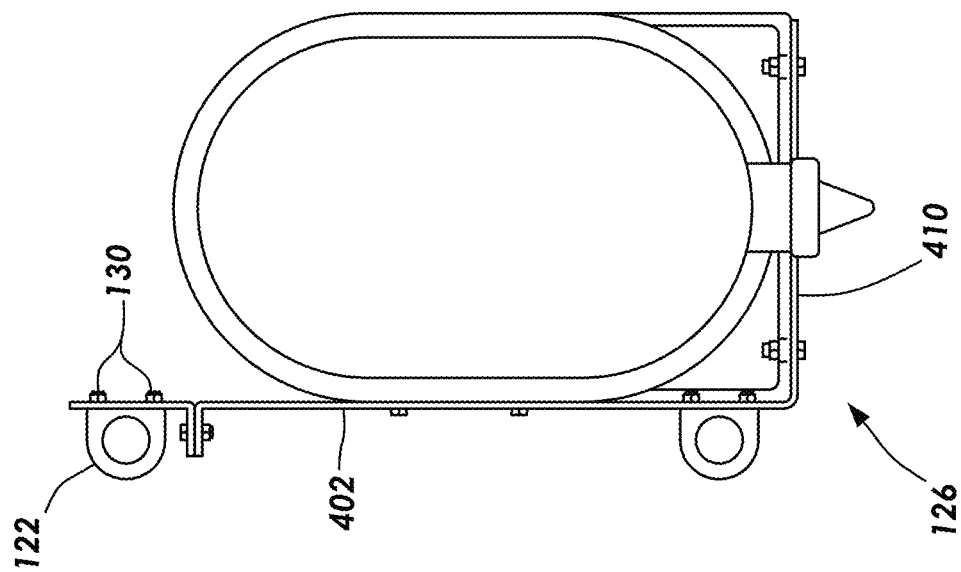
FIG. 5b depicts a side view of an air filter adjustable mount consistent with certain embodiments of the present disclosure.
Figure 5A:
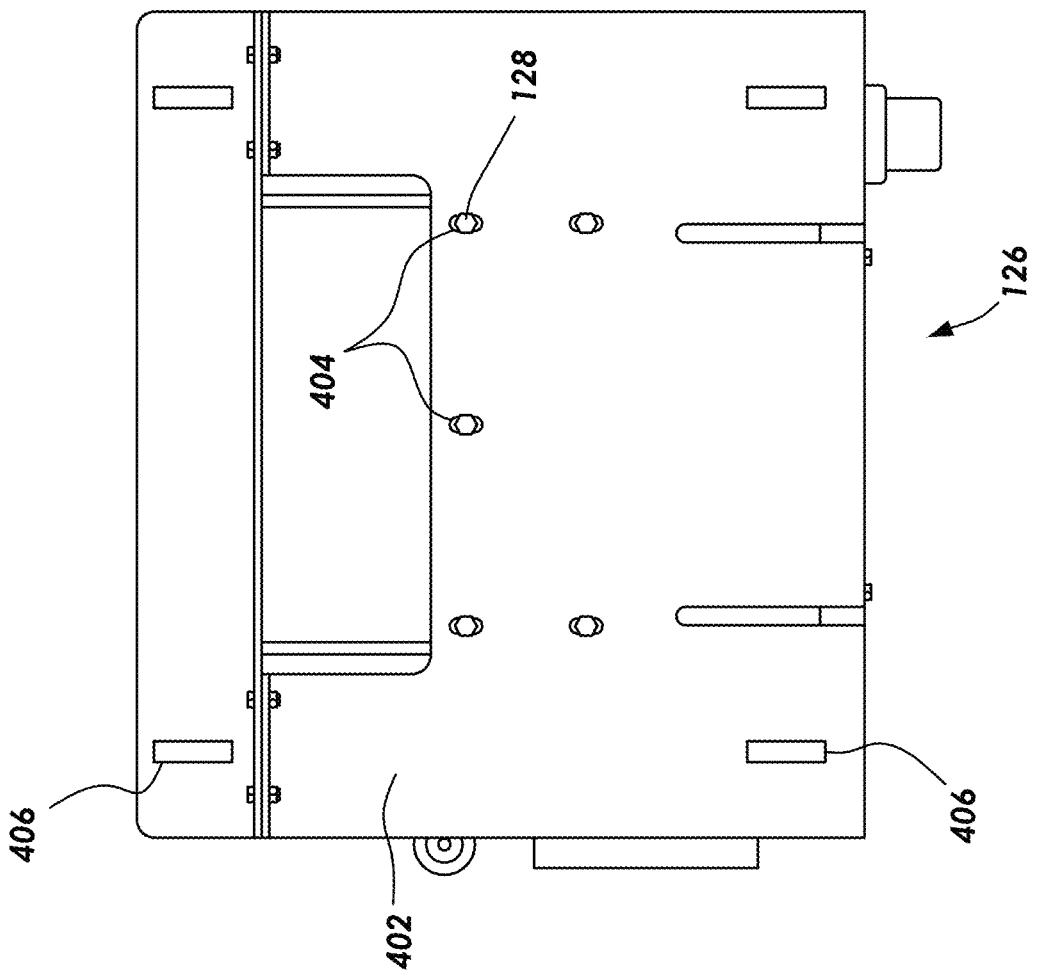
FIG. 5a depicts a rear view of an air filter adjustable mount consistent with certain embodiments of the present disclosure.

FIGS. 5a and 5b depict a rear view and side view of air filter adjustable mount 126. FIG. 5a shows back plate 402 of air filter adjustable mount 126. Back plate 402 includes a plurality of mounting holes 404 for mounting air filter 124, such as by fasteners 128. Fasteners 128 may be screws, bolts or other fastening devices. Back plate 402 further includes a plurality of slots 406 for mounting air filter adjustable mount 126 to side support 122. Slots 406 may be, for instance, between ¼" and 1" long so that tabs 130 (shown in FIG. 5b) of side support 122 may be adjustable within the length of slots 406.

FIG. 5b depicts back plate 402 and bottom plate 410. In certain embodiments, back plate 402 and bottom plate 410 may be integral, i.e., a single piece. In other embodiments, back plate 402 and bottom plate 410 may be separate pieces that have been welded or otherwise affixed. Back plate 402 and bottom plate 410 may be perpendicular or approximately perpendicular to one another. Air filter 124 may sit within air filter adjustable mount 126.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method of mounting a discharge pump comprising:
 positioning the discharge pump;
 supplying an adjustable mount, the adjustable mount including:
  a bottom plate, the bottom plate including a plurality of rows of slots;
  two side gussets, the side gussets having tabs, the tabs inserted in the rows of slots of the bottom plate;
  a top plate, the top plate positioned perpendicularly to the two side gussets and in parallel with the bottom plate, the top plate affixed to the side gussets;
 orienting the adjustable mount so as to support the discharge pump by adjusting the position of the two side gussets with respect to the bottom plate; and
 supporting the discharge pump with the adjustable mount.

2. The method of claim 1, wherein the step of adjusting the position of the two side gussets includes moving the tabs within the slots.

3. The method of claim 1 further comprising prior to supporting the discharge pump with the adjustable mount:
 welding the bottom plate to the side gussets; and
 welding the side gussets to the top plate.

4. The method of claim 1, wherein the adjustable mount further includes cutouts.

5. The method of claim 1, wherein the adjustable mount further includes a support cross plate, the support cross plate connected to the bottom plate and perpendicular to the two side gussets and the bottom plate.

6. The method of claim 1, wherein the top plate has mounting holes.

7. The method of claim 1, wherein the slots are between ¼" and ¾" wide.

8. The method of claim 1, wherein the slots are ½" wide.

9. The method of claim 1, wherein the discharge pump is a centrifugal pump.

* * * * *